UNITED STATES PATENT OFFICE.

THOMAS A. CRAWFORD, OF LOUISVILLE, KENTUCKY.

COFFEE COMPOSITION.

1,161,925.  Specification of Letters Patent.  Patented Nov. 30, 1915.

No Drawing.  Application filed April 22, 1915.  Serial No. 23,018.

*To all whom it may concern:*

Be it known that I, THOMAS A. CRAWFORD, a citizen of the United States of America, residing at Louisville, in the county of Jefferson and State of Kentucky, have invented a new and useful Composition of Matter to be Used for a Coffee Composition, of which the following is a specification.

My composition consists of the following ingredients, combined in the proportions stated, viz: roasted and ground coffee 90 per cent., roasted and ground peaches 10 per cent.

In making this coffee compound sun dried peaches are selected because of the peculiar flavor which is retained in peaches by this method of drying rather than by other methods. These sun dried peaches are roasted for approximately sixty minutes or until they attain the color of chocolate. When the peaches have this color the fruit oil has fully developed its richest flavor. The roasted peaches are then removed from the container in which they have been roasted and allowed to cool; after which they are either ground or pulverized ready to be mixed with the ground or pulverized coffee.

The coffee is roasted in the usual way and either ground or pulverized, after cooling.

After both the peaches and coffee have been roasted, cooled and ground or pulverized, as the case may be, a mixture of ninety per cent. coffee and ten per cent. peaches is placed in a mixing cylinder or other mixer and thoroughly blended or mixed. This mixing is usually accomplished in approximately fifteen minutes.

This compound gives an entirely new flavor to the trade and one which has been proven to be especially well appreciated in making iced coffee.

What I claim is:

1. A coffee composition comprising roasted and ground dried peaches mixed with roasted and ground coffee.

2. A coffee composition comprising roasted and pulverized dried peaches mixed with roasted and pulverized coffee.

3. A coffee composition comprising a mixture of roasted dried peaches and roasted coffee.

4. The process of making a coffee composition consisting in roasting dried peaches to a point where they attain the color of chocolate and adding ten parts thereof to ninety parts of roasted coffee.

5. The process of making a coffee composition consisting in roasting dried peaches to a point where they attain the color of chocolate and then grinding the same, and mixing ten parts of said ground roasted peaches to ninety parts of roasted ground coffee.

6. The process of making a coffee composition consisting in roasting and pulverizing peaches and adding ten parts thereof to ninety parts of roasted, pulverized coffee, and mixing the ingredients.

In testimony whereof I affix my signature.

THOS. A. CRAWFORD.